(12) United States Patent
van Poppel

(10) Patent No.: US 11,577,685 B2
(45) Date of Patent: Feb. 14, 2023

(54) ADAPTIVE LOAD-LIMITING SEATBELT ASSEMBLY

(71) Applicant: Jean Alain van Poppel, Conroe, TX (US)

(72) Inventor: Jean Alain van Poppel, Conroe, TX (US)

( * ) Notice: Subject to any disclaimer, the term of this patent is extended or adjusted under 35 U.S.C. 154(b) by 0 days.

(21) Appl. No.: 17/336,783

(22) Filed: Jun. 2, 2021

(65) Prior Publication Data

US 2021/0380068 A1 Dec. 9, 2021

Related U.S. Application Data

(60) Provisional application No. 63/102,220, filed on Jun. 3, 2020.

(51) Int. Cl.
*B60R 22/34* (2006.01)
*B60R 22/343* (2006.01)
*B60R 22/44* (2006.01)

(52) U.S. Cl.
CPC ........ *B60R 22/3413* (2013.01); *B60R 22/343* (2013.01); *B60R 2022/4473* (2013.01)

(58) Field of Classification Search
CPC .......................... B60R 22/343; B60R 22/3413
See application file for complete search history.

(56) References Cited

U.S. PATENT DOCUMENTS

| 5,547,143 A | 8/1996 | Miller, III et al. |
| 6,216,973 B1 * | 4/2001 | Bauer .................. B60R 22/343 |
| | | 242/384.3 |
| 6,384,518 B1 | 5/2002 | van Poppel |
| 7,318,560 B2 | 1/2008 | Clute |
| 7,392,957 B2 | 7/2008 | Hiramatsu |
| 7,478,836 B2 * | 1/2009 | Lenning .............. B60R 22/3413 |
| | | 280/805 |
| 7,669,794 B2 | 3/2010 | Boelstler et al. |
| 7,806,357 B2 | 10/2010 | Clute |
| 8,116,948 B2 * | 2/2012 | Lenning .................. B60R 22/28 |
| | | 701/45 |
| 9,650,015 B2 * | 5/2017 | Specht ................ B60R 22/3413 |
| 10,399,540 B2 | 9/2019 | Gray |

(Continued)

FOREIGN PATENT DOCUMENTS

| CN | 111873866 A * 11/2020 ........... B60N 2/2803 |
| DE | 102011101517 A1 * 11/2012 ......... B60R 22/3413 |

(Continued)

OTHER PUBLICATIONS

Van Poppel, J.A., Rath Stern, A., Fortenbaugh, D., Wilcox, G, "A Parametric Study of an Adaptive Load-Limiting Restraint System with Weight Sensing Considerations", presented Jun. 12, 2019 at the 2019 ESV International Technical Conference, Eindhoven, Netherlands, Jun. 10-13, 2019 and made available to the public sometime after the end of the conference, 22 pages.

*Primary Examiner* — Paul N Dickson
*Assistant Examiner* — Maxwell L Meshaka
(74) *Attorney, Agent, or Firm* — Hooker & Habib, P.C.

(57) ABSTRACT

An adaptive load-limiting seatbelt assembly for a passenger vehicle includes a rotatable spool drum storing a length of seatbelt fabric and a piezoelectric device including a controller that can dynamically control torque applied to the spool drum resisting pay-out of the seatbelt from the spool drum during a dynamic event such as a vehicle crash.

24 Claims, 9 Drawing Sheets

(56) References Cited

U.S. PATENT DOCUMENTS

| | | | |
|---|---|---|---|
| 2002/0113424 A1* | 8/2002 | Smith, Jr. | ........... B60R 22/3413 |
| | | | 280/806 |
| 2006/0082127 A1 | 4/2006 | Clute | |
| 2006/0255583 A1* | 11/2006 | Lenning (Ingemarsson) | .............. |
| | | | B60R 21/01516 |
| | | | 280/805 |
| 2007/0228204 A1 | 10/2007 | Lenning | |
| 2009/0005935 A1* | 1/2009 | Lenning | ............ B60R 21/01516 |
| | | | 701/45 |
| 2009/0057470 A1 | 3/2009 | Hiramatsu et al. | |
| 2015/0122931 A1* | 5/2015 | Specht | ................ B60R 22/3413 |
| | | | 242/379.1 |
| 2020/0216016 A1 | 7/2020 | Schlaps et al. | |
| 2020/0307507 A1 | 10/2020 | Jaradi et al. | |

FOREIGN PATENT DOCUMENTS

| | | | | |
|---|---|---|---|---|
| GB | 2420610 A | * | 5/2006 | ........... B60R 21/015 |
| WO | WO-2013132307 A1 | * | 9/2013 | ......... B60R 22/3413 |

* cited by examiner

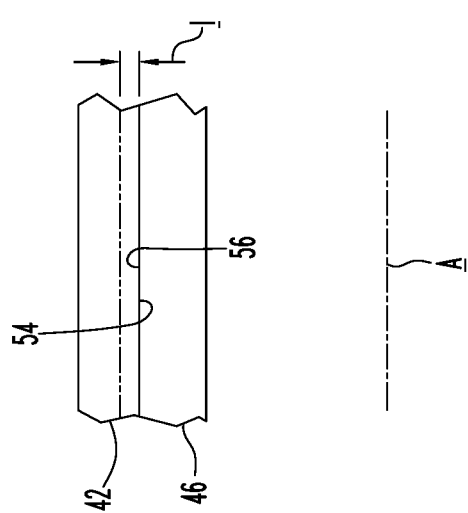
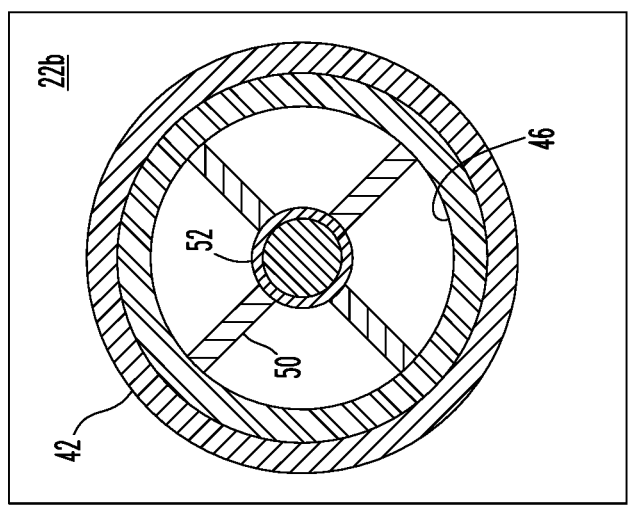

ADAPTIVE LOAD-LIMITING SEATBELT ASSEMBLY

RELATED APPLICATION

This application claims priority to and the benefit of the filing date of U.S. provisional patent application 63/102,220 filed Jun. 3, 2020 and entitled "Adaptive Load-Limiting Seatbelt System", which provisional application was on the filing date of this application and is incorporated by reference as if fully set forth herein.

FIELD OF THE DISCLOSURE

The disclosure relates generally to seatbelt assemblies for passenger vehicles, and more particularly, to a seatbelt assembly that adaptively apportions seatbelt forces applied to a vehicle occupant during a crash.

BACKGROUND OF THE DISCLOSURE

Vehicle seatbelt assemblies protect vehicle occupants in the event of a dynamic event such as a crash or other substantial vehicle deceleration event. For front seat occupants, the seatbelt assemblies may work in conjunction with air bags for occupant protection.

Typical seatbelt assemblies for passenger vehicles include a retractor generally configured as a spool drum normally free to rotate about an axis. The spool drum is supported in a frame attached to the passenger vehicle body or frame. The frame may define a pair of support elements that rotatably support the spool drum. Seatbelt webbing is looped around the spool drum. Sufficient length of webbing is looped around the spool drum to accommodate seatbelt pay-out for a vehicle occupant at least as large as a 95th percentile male.

The seatbelt assembly is further complemented with a locking mechanism that engages during the dynamic event. The spool drum is quickly locked to prevent free rotation of the spool drum. The spool drum cannot pay-out the seatbelt webbing and the occupant is restrained by the seatbelt during the dynamic event.

Seatbelt assemblies are also commonly equipped with a pretensioner that can rotate the spool drum in a direction opposite to the seatbelt webbing pay-out direction of rotation. The pretensioner quickly tightens the seatbelt against an occupant. Pretensioning enables the seatbelt to restrain the occupant more quickly at the start of the dynamic event.

During the dynamic event, the occupant loads the seatbelt, and in return the seatbelt applies force to the occupant. Without any additional technology the seatbelt typically stretches somewhat from occupant loading (typically at most one to three inches).

Seatbelt assemblies are commonly equipped with a load limiting system to lower peak seatbelt forces applied to the occupant. The load limiting system acts to effectively add additional seatbelt pay-out in addition to the inherent seatbelt webbing stretch. A load limiting system typically includes a torsion bar that may be formed as an inner shaft located inside the larger diameter of the spool drum. One end of the torsion bar is attached to the seatbelt assembly frame or support and the other end of the torsion bar is non-rotatably connected to the spool drum via a locking mechanism.

When the locking mechanism is in the unlocked state, the spool drum and torsion bar can rotate together to pay-out or take in seatbelt webbing during normal vehicle operation.

In a crash or other severe dynamic event the locking mechanism moves to its locked state, coupling the spool drum to the first end of the torsion bar. Occupant loading on the seatbelt rotates the spool drum and applies torque to the whole torsion bar. The torsion bar is designed to deform or deflect in a controlled manner in response to the torque being applied by the spool drum. The torsion bar enables a notable but controlled rotational displacement of the spool drum during the dynamic event.

Torsion bars come in various sizes and various arrangements with the spool drum to enable different force profiles, and can operate alone or with other components to limit rotation displacement of the spool drum. But a given torsion bar within a seatbelt assembly generates only one force profile during a dynamic event.

Load limiting seatbelt assemblies are offered in a number of alternative designs, including band wrapper, metal cutting, or hydraulic load limiting designs.

Load-limiting seatbelt assemblies are typically provided for only front-seat passengers protected by air bags. The air bags enable the load-limiting seatbelt assembly to pay-out the seatbelt webbing without injury to the occupant.

If load-limiting seatbelt assemblies are provided to back-seat passengers, they are typically much stiffer versions that are mechanically designed to have much more resistance to spool drum rotation. These stiffer seatbelt assemblies essentially offer a fixed high resistance and are not as effective in lowering peak seatbelt forces applied to occupants. Lighter occupants are generally restrained too much, the fixed resistance too high for load mitigation, and the pay-out during the dynamic event is essentially limited to webbing stretch. Heavier occupants are not restrained enough, the fixed resistance too low and enabling the occupant to move forward and impacting interior elements of the vehicle (including perhaps a seatback in front of the occupant).

Although there are many different designs of load limiting seatbelt assemblies, none of them actively and continuously adapt to a range of occupant weights, to different dynamic event profiles and severities, and to different occupant seating positions—including belted occupants in child safety seats or occupants with seating positions that deviate from the normal.

Thus there is a need for a load limiting seatbelt assembly that can better and continuously control pay-out of a seatbelt from the seatbelt retractor during a dynamic event to better adapt seatbelt pay-out and peak seatbelt force applied to the occupant. The seatbelt assembly should actively adapt to a range of occupant weights, a range of different dynamic event profiles and severities, and different occupant seating positions within the vehicle.

SUMMARY OF THE DISCLOSURE

Disclosed is a seatbelt assembly that can better control pay-out of a seatbelt from a seatbelt retractor during a dynamic event such as a crash. The seatbelt assembly can adapt and properly apportion peak seatbelt forces applied to the occupant, is usable in any seating location, and responds in real time to the dynamic environment and loading of the seatbelt by occupants having different weights.

An adaptive load-limiting seatbelt assembly in accordance with this disclosure utilizes a Tailored Control Joint (TCJ) that dynamically controls seatbelt forces and pay-out of the seatbelt during a dynamic event. A TCJ is a piezo-electric device (a device containing an active member made of a piezoelectric material) that combines electrical and mechanical components that control pay-out of a seatbelt through a control system during a dynamic event to adapt and advantageously apportion peak seatbelt force applied to occupant.

A TCJ includes an outer member mounted about an inner member for relative motion on mutually engaged concentric bearing surfaces. The two members are assembled together such that the surfaces can engage each other with an interference fit that resists relative motion and frictionally couples the members. One of the members is operatively connected to the spool drum so that resistance of relative motion between the two members results in resistance to rotation of the spool drum.

The TCJ enables modulation of the friction force by the control system. One member is a piezoelectric component whereby the bearing surface of the piezoelectric component can move towards or away from the bearing surface of the other member when a voltage difference is applied by a control to the piezoelectric component that selectively increases or decreases an interference fit defined between the bearing surfaces. The controller selectively controls the frictional coupling of the two members by varying the voltage applied to the piezoelectric component to increase or decrease the interference fit between the two surfaces.

Principles of operation of possible embodiments of a TCJ are disclosed in my U.S. Pat. No. 6,384,518 which is incorporated by reference as if fully set forth herein.

The control system of the TCJ of the disclosed adaptive load-limiting seatbelt assembly measures both the instantaneous amount of real-time seatbelt pay-out and the instantaneous real-time rate of change (that is, velocity) of seatbelt pay-out during the dynamic event. A controller of the control system uses this data to apply voltage to the piezoelectric component that determines the frictional force generating torque or moment resisting rotation of the spool drum and thus pay-out of the seatbelt. The controller can vary the voltage and thus the friction force dynamically as needed in response to the data to control seatbelt pay-out and thereby limit load applied to the occupant by the seatbelt.

The control system can include a first sensor to measure the rate of seatbelt pay-out and a second sensor to measure the amount of seatbelt pay-out. Alternatively, only the first sensor is used and the amount of seatbelt pay-out is calculated by the controller by mathematical integration of the rate data, or only the second sensor is used and the rate of pay-out is calculated by mathematical differentiation of the data. The controller can in possible TCJ embodiments be of the directly proportional feedback type utilizing in a control algorithm the substantially direct proportionality between the load applied to the occupant by the seatbelt and the voltage applied to the piezoelectric component. The proportionality constant may be determined by mathematical modeling or by actual testing of a seatbelt assembly.

Both modeling and testing has shown a 15 millisecond response time for multi-kiloNewton load changes and variations in friction generation (due to changes in operating temperature, mechanical and electrical tolerances, and the like) of about +/−5% from target values can provide the desired adaptive load limiting capability for an adaptive seatbelt assembly.

Because the control system does not require information about the occupant's weight or inertia, the design of the control system is advantageously simplified while still enabling the control system to provide adaptive load limiting for occupants of different weights.

The control system, however, can include one or more additional sensors (for example, a sensor to provide the controller with the occupant's weight) for additional data for further tailoring the adaptive load limiting response of the seatbelt assembly.

The disclosed adaptive load limiting seatbelt assembly is particularly advantageous for use in rear-seat occupant positions (that is, not front-seat occupant positions). Rear-seat occupants generally do not have the protection of air bag systems and must rely on the seatbelt assembly to limit and reduce injury from a dynamic event.

In first possible embodiments of the disclosed adaptive load-limiting seatbelt assembly, the seatbelt assembly includes a frame, a spool drum rotatably supported on the frame for rotation about an axis, and a TCJ that includes a piezoelectric member having a first annular bearing surface facing a second annular bearing surface of a housing containing the piezoelectric member. One of the piezoelectric member and the housing is connected to a spool drum whereby rotation of the spool drum urges rotation of the connected member. The other member is fixedly attached relative to the frame. The diameter of the piezoelectric bearing surface is selectively adjustable by a control system of the TCJ to dynamically generate an interference fit between the bearing surfaces that controls rotation of the spool drum during a dynamic event. The connected TCJ member may be connected to the spool drum through a torsion bar or other type of non-rotatable connection.

The housing may include one or more openings that enable wire(s) of the control system to pass into the housing.

In second possible embodiments of the disclosed adaptive load-limiting seatbelt assembly, the piezoelectric member is surrounded by the spool drum and the second bearing member of the TCJ is a facing surface of the spool drum.

Embodiments of the disclosed adaptive load-limiting seatbelt assembly may include the TCJ operating in cooperation with a locking mechanism. In other possible embodiments the TCJ may also function as a locking mechanism.

Other objects and features of the disclosure will become apparent as the description proceeds, especially when taken in conjunction with the accompanying drawing sheets illustrating one or more illustrative embodiments.

BRIEF DESCRIPTION OF THE DRAWINGS

FIG. 3 is a vertical section view of the seatbelt assembly shown in FIG. 1 taken through line 3-3 of FIG. 2.

FIG. 4 is a diagram illustrating generation of the interference fit by the TCJ of the seatbelt assembly shown in FIG. 2.

DETAILED DESCRIPTION

Figure 1:
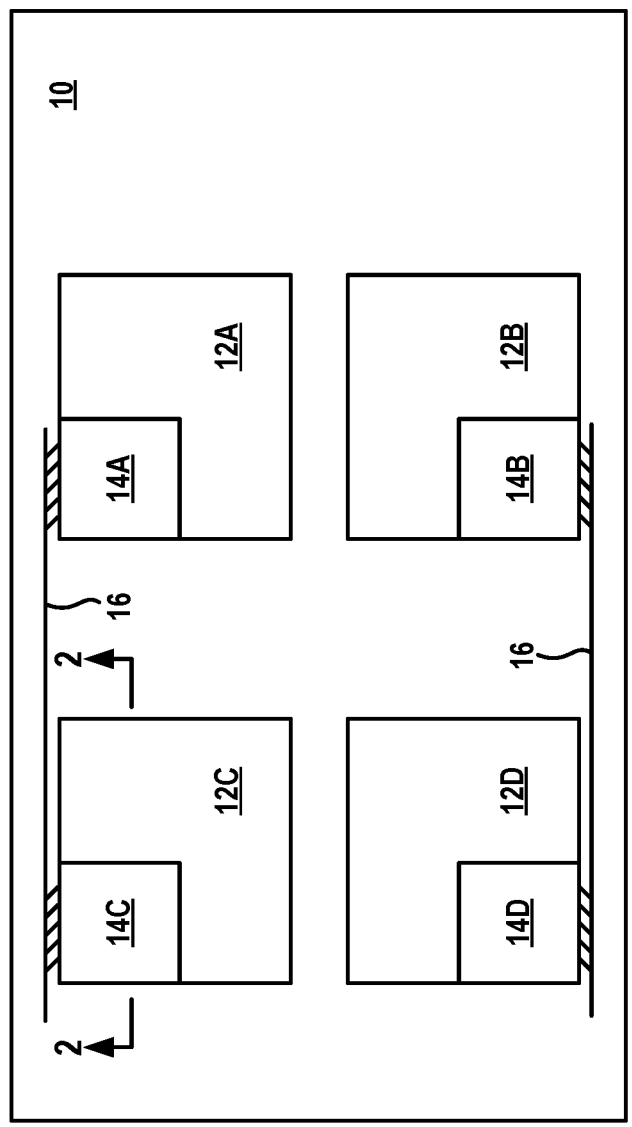
FIG. 1 is a schematic view of a passenger vehicle employing first embodiment adaptive load-limiting seatbelt assemblies in accordance with this disclosure.

FIG. 1 schematically illustrates a non-limiting passenger vehicle 10, which may be a type of automobile, truck, agricultural vehicle, airplane, or other type of powered or non-powered vehicle (for example, a glider) in which it is desired or required to have seatbelt occupant restraints. The vehicle may be a manually driven vehicle or may be an autonomous vehicle. The interior of the illustrated vehicle 10 has four occupant seating positions 12. Seating positions 12A and 12B are front-seat seating positions and seating positions 12C and 12D are rear-seat seating positions.

Each seating position 12 is provided with a respective first embodiment adaptive load-limiting seatbelt assembly 14 for use by an occupant in the seating position. The seatbelt assemblies 14 are fixedly attached to the vehicle frame or body 16. Applicable law may require that each seatbelt assembly 14 be a three-point seatbelt that forms a lap belt and shoulder belt for each occupant.

Figure 2:
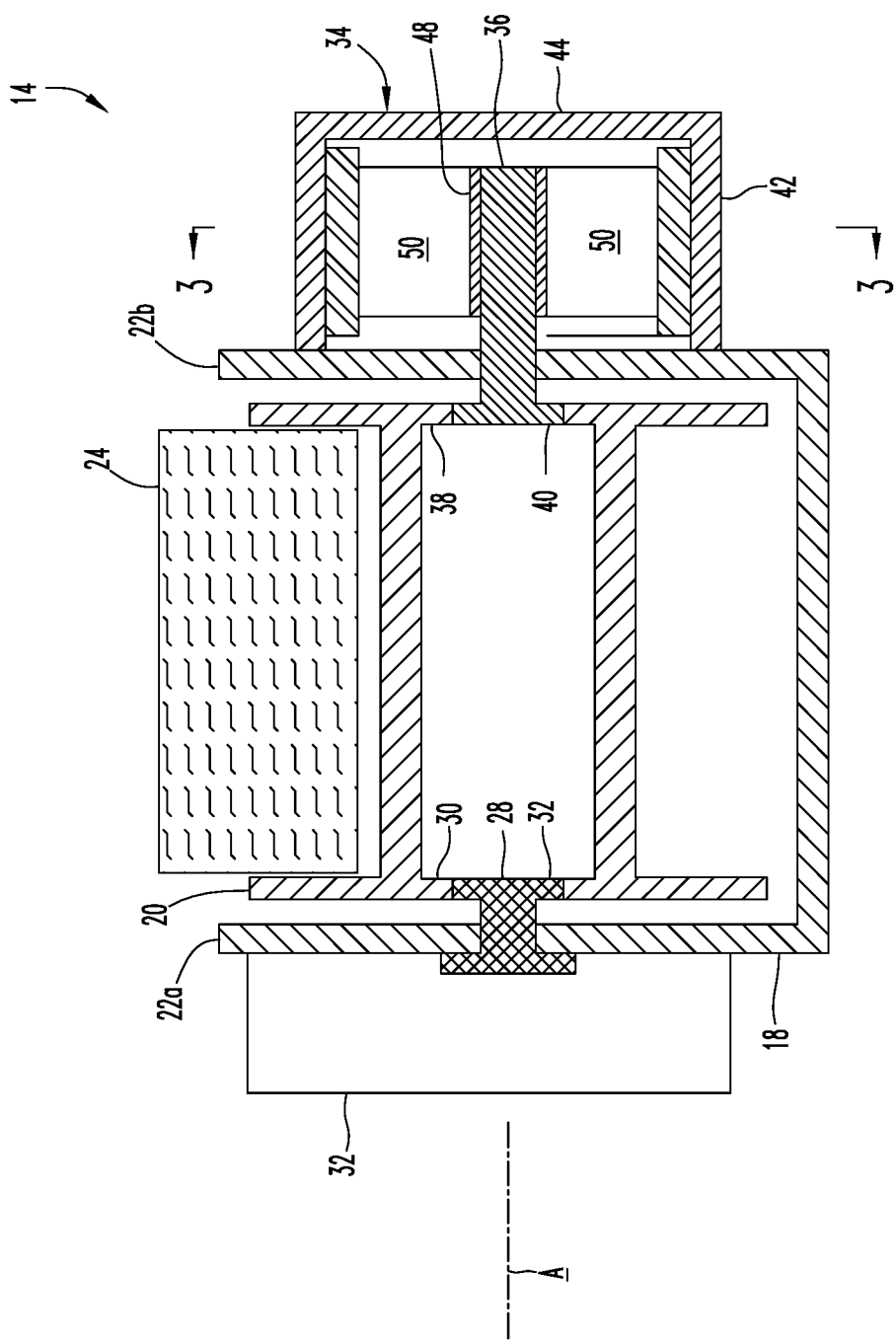
FIG. 2 is a vertical sectional view of one of the seatbelt assemblies shown in FIG. 1 taken through line 2-2 of FIG. 1.
Figure 5:
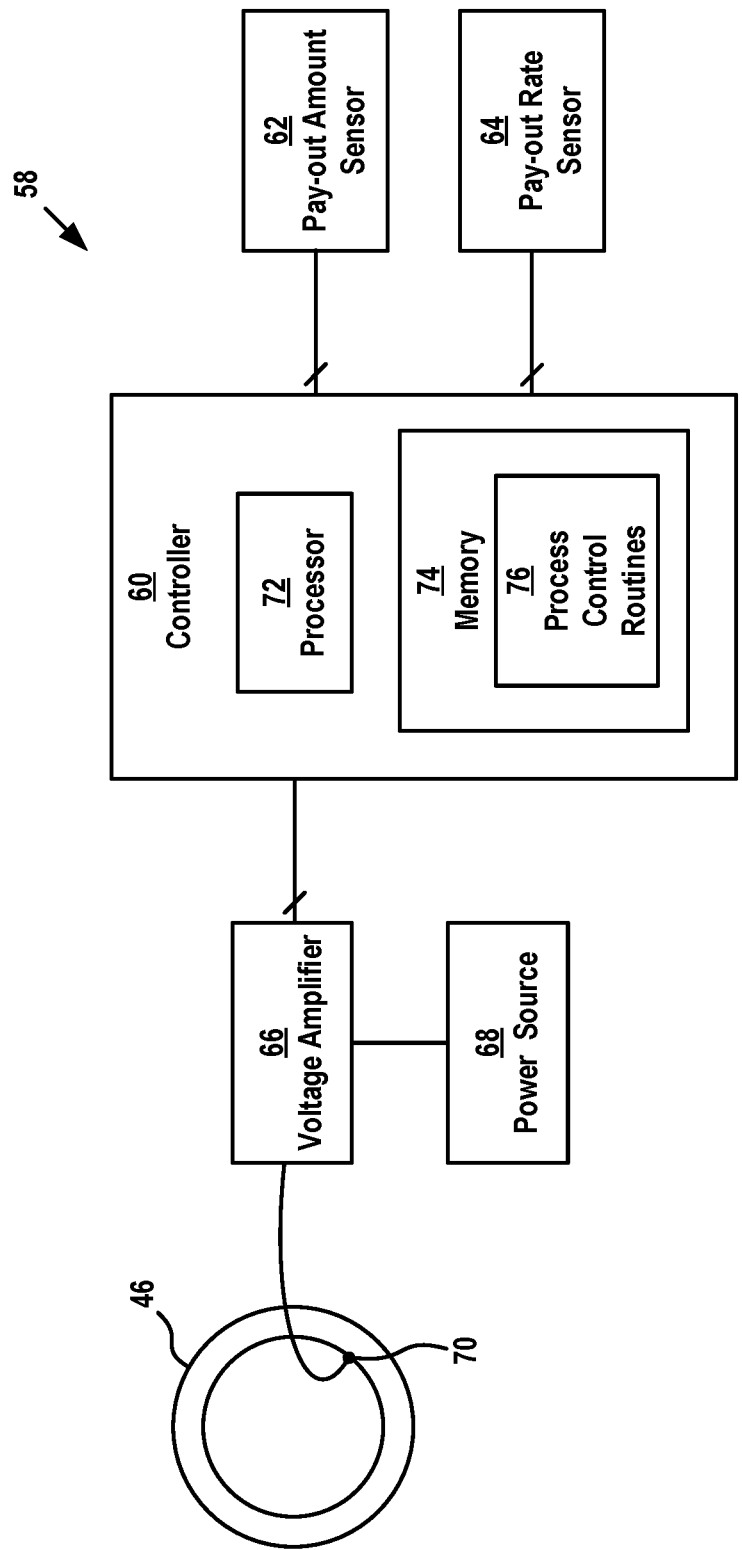
FIG. 5 is a schematic diagram of the control system of the TCJ of the seatbelt assembly shown in FIG. 2.
Figure 6:
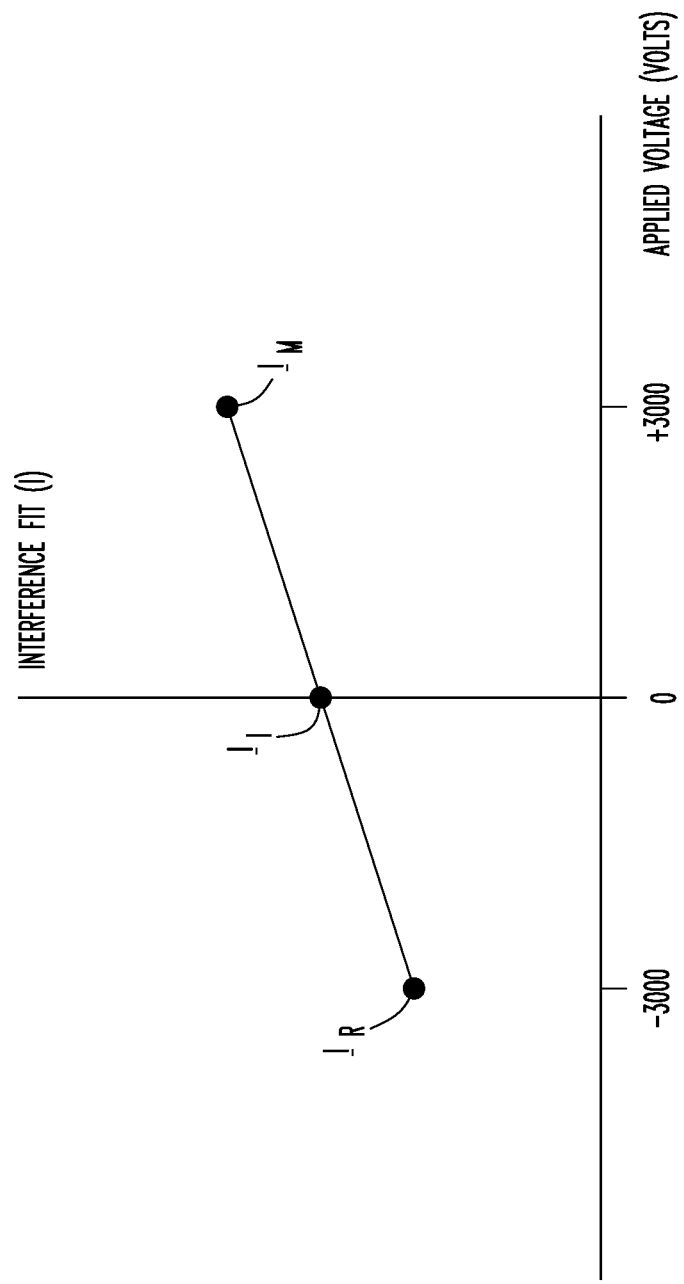
FIG. 6 is a graph illustrating radial interference fit versus applied voltage applied by the control system to the piezoelectric member of the TCJ of the seatbelt assembly shown in FIG. 2.

FIGS. 2-4 illustrate the mechanical components of the first embodiment seatbelt assembly 14, and FIG. 5-6 schematically illustrates the control system of the seatbelt assembly 14.

The seatbelt assembly 14 includes a frame 18 that is rigidly fastened to the vehicle frame or body 16. The seatbelt assembly includes a retractor assembly that includes a spool drum 20 located between a pair of spaced apart sidewalls 22a, 22b of the frame 18. The spool drum 20 stores a length of seatbelt webbing represented as fabric patch 24. The spool drum 20 rotates about an axis of rotation A in a pay-out direction to pay-out seatbelt webbing and rotates in an opposite retraction direction to take in seatbelt webbing.

Attached to the outside of the sidewall 22a is a pretensioner 26. The pretensioner 26 is operably connected to the spool drum 20 by a first end of a first shaft 28 rotatably mounted in the sidewall 22a coaxial with the rotational axis A. The shaft 28 is formed as a stub shaft connected to the pretensioner 26, the connection of the first end of the stub shaft 28 to the pretensioner 26 represented by the radially enlarged first end of the stub shaft 28.

The second end of the stub shaft 28 is non-rotatably connected to the spool drum 20 at the cooperating spool drum and stub shaft flanges 30, 32 inside the frame 18 and adjacent to the frame sidewall 22a. The cooperating flanges 30, 32 form a splined or keyed connection whereby rotation of the spool drum 20 urges rotation of the stub shaft 28.

Attached to the outside of the sidewall 22b is a Tailored Control Joint (TCJ) 34. The TCJ 34 is operably connected to the spool drum 20 by a second shaft 36 rotatably mounted in the sidewall 22b coaxial with the rotational axis A. The second shaft 36 is typically axially longer than the stub shaft 28 and operates as a substantially rigid bar during a dynamic event.

The first end of the second shaft 36 is non-rotatably connected to the spool drum 20 at the cooperating spool drum and shaft flanges 38, 40 inside the frame 18 and adjacent to the frame sidewall 22b. The cooperating flanges 38, 40 form a splined or keyed connection whereby rotation of the spool drum 20 urges rotation of the second shaft 36.

The TCJ 34 includes a cylindrical housing 42 fixedly attached to the sidewall 22b and closed by an end wall 44. Closely received in the housing 42 is a cylindrical ring 46 made of piezoelectric material. The housing 42 and the piezoelectric ring 46 are both concentric with the rotational axis A. The second shaft 36 extends into the housing 42 but ends before reaching the housing end wall 44.

The piezoelectic ring 46 is supported on the second shaft 36 within the housing 42 by a multi-vaned spider 48 having circumferentially spaced and radially extending vanes 50 fixedly connected to the inner wall of the piezoelectric ring 46. A portion of the second shaft 36 in the housing 42 is formed as a splined or keyed connection that forms a non-rotatable connection with a cooperating splined sleeve 52 of the spider 48, thereby non-rotatably connecting the second shaft 36 with the piezoelectric ring 46.

FIG. 4 illustrates generation of the interference fit I between the housing 42 and the piezoelectric ring 46 of the TCJ 34. The housing 42 has an annular inner bearing surface 54 closely surrounding an annular outer bearing surface 56 of the piezoelectric ring 46. The unstressed outer diameter of the bearing surface 56 is dynamically controlled by the TCJ control system 58 (see FIG. 5) as will be described in more detail below and as disclosed in my U.S. Pat. No. 6,384,518. Through operation of the control system 58, the bearing surfaces 54, 56 cooperatively define a controllable radial interference fit I between them that generates a friction force resisting or even preventing relative rotation of the piezoelectric ring 46 relative to the housing 42.

Upon initiation of a dynamic event, the pretensioner 26 operates in milliseconds (perhaps in response to an actuation signal generated by an air bag system) to rotate the spool drum 20 in the retraction direction and tighten the seatbelt against the occupant. The pretensioner 26 is designed to form a one-way non-rotatable connection with the stub shaft 28 so as to only drive the spool drum 20 in the retraction direction and tighten the seatbelt.

Deceleration of the vehicle caused by the dynamic event moves the occupant forward relative to the vehicle frame or body and against the tightened seatbelt worn by the occupant. Seatbelt webbing attempts to unspool from the spool drum 20, urging the spool drum 20 to rotate in a pay-out direction. The spool drum 20 applies torque through the non-rotatable connection between the spool drum 20 urging rotation of the second shaft 36 and thereby also urging rotation of the piezoelectric ring 46 about the rotational axis A.

The control system 58 recognizes the dynamic event by the sudden high rate of seatbelt webbing pay-out or in response to a signal (from an airbag deployment system for example) indicating the start of a dynamic event. The control system 58 controls the interference fit I between the TCJ bearing surfaces 54, 56 and thereby controls the frictional force between the bearing surfaces resisting relative rotation of the piezoelectric ring 46 with the housing 42. The frictional force thereby also acts through the non-rotatable connection between the piezoelectric ring 46 and the second shaft 36 to resist rotation of the second shaft 36 and the spool drum 20. The TCJ 34 effectively controls rotation of the second shaft 36, and therefore pay-out of the seatbelt webbing from the spool drum 20 during the dynamic event.

The TCJ control system 58 generates an initial predefined interference fit between the housing 42 and the piezoelectric ring 46 at the opening of the dynamic event. This initial interference fit defines an initial resistance to rotation of the spool drum 20. The interference fit can then be modulated (increased, decreased, or staying the same) for controlled pay-out of the seatbelt from the spool drum 20 to increase, decrease, or maintain the rate of pay-out during the dynamic event.

The control system 58 reacts to pay-out of the seatbelt to increase, decrease, or maintain the interference fit I to adaptively limit the seat belt force applied to the occupant during the dynamic event. A heavier occupant would generate a relatively high rate of seatbelt pay-out while a lighter occupant would generate a relatively low rate of seatbelt pay-out. The control system dynamically regulates the interference fit as necessary to control the rate of pay-out and total pay-out of the seatbelt during the dynamic events. Greater pay-out may be allowed for different seating positions; for example, front-seat seatbelt assemblies 14A, 14B may permit greater seatbelt pay-out than would rear-seat seatbelt assemblies 14C, 14D. Applicable law may limit the maximum seatbelt pay-out; the control system 58 in possible embodiments may sufficiently increase the interference fit to "lock" the spool drum 20 and prevent pay-out of the seatbelt past the amount allowed by law.

FIG. 5 schematically illustrates the control system 58. The control system 58 may be disposed entirely or partially inside the frame 18 of the seatbelt assembly 14 or in the housing 42. The TCJ housing 42 may include wall openings or may include gaps between the housing 42 and the frame sidewall 22b to pass wire(s) of the control system into or out of the housing.

The control system 58 includes a controller 60 that receives information from a first sensor 62 that transmits a data signal representing the pay-out amount of seatbelt from the spool drum 20 and a second sensor 64 that transmits a data signal representing the rate of seatbelt pay-out from the spool drum 20. The controller 60 uses this information to transmit control signals to a voltage amplifier 66 connected to a power source or voltage source 68. The voltage amplifier 66 is electrically connected to the piezoelectric ring 46 by an electrical connection 70 to dynamically set the voltage applied to the piezoelectric ring and radially enlarge or reduce the unstressed diameter of the ring bearing surface 56 to establish the instantaneous interference fit I between the piezoelectric ring 46 and the housing 42.

The controller 60 includes a processor 72 operatively connected to a memory 74. The memory 74 stores process control routines 76 that are executed by the processor 72 using the data signals received from the first sensor 62 and the second sensor 64. The process control routines 76 calculate the desired voltage signal transmitted to the voltage amplifier 66.

Other embodiments of the control system 58 may use additional or different sensors. For example, the vehicle 10 may have a collision-avoidance system that automatically applies the brakes to prevent a collision. The avoidance system could signal the seatbelt assemblies 14 of a potential impending collision event so that each TCJ control system 58 can set a desired initial interference fit even before a dynamic event begins. As another example, each occupant seating location 12 is provided with a weight sensor that transmits a signal to the control system 58 representing the weight of the occupant. The occupant's weight may be used by the process control routines 76 to more customize the controlled pay-out of the seatbelt during a dynamic event. As yet another example, the control system 58 may receive an actuation signal from an airbag system as previously described.

FIG. 6 illustrates a possible relationship between applied voltage (V) applied by the control system 58 and the interference fit I generated between the piezoelectric ring 46 and the housing for a representative embodiment of the TCJ 34. The torque required to overcome the friction generated between the piezoelectric ring 46 and the housing 42 resisting relative rotation therebetween is a function of the magnitude of the interference fit, the amount of surface area in contact with one another, and the effective radius at the interference fit.

In the illustrated embodiment, the piezoelectric ring 46 and the housing 42 are configured to generate an initial interference fit $I_I$ if no voltage is applied to the piezoelectric ring 46. A seatbelt webbing tension of about 4,000 Newtons (about 900 pounds force) is required to initiate pay-out of the seatbelt webbing. If the voltage is reduced to −3000 volts, the interference fit reduces to an interference fit $I_R$. This reduced interference fit requires a seatbelt webbing tension of about 2,000 Newtons (about 450 pounds force) to initiate pay-out of the seatbelt webbing. If the voltage is increased to +3000 volts, the interference fit increases to an interference fit $I_M$. This increased interference fit requires a seatbelt webbing tension of about 6,000 Newtons (about 1350 pounds force) to initiate pay-out of the seatbelt webbing.

Figure 7:
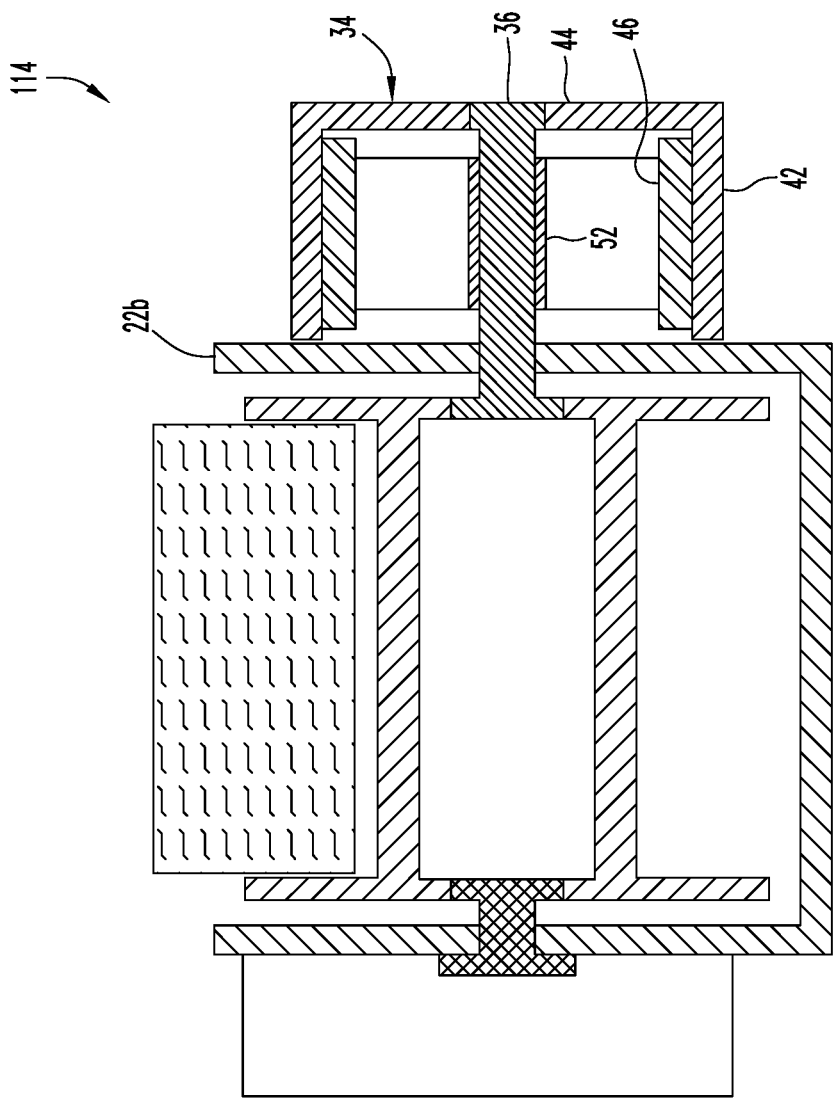
FIG. 7 is a vertical section view similar to FIG. 2 but of a second embodiment adaptive load-limiting seatbelt assembly in accordance with this disclosure.

The TCJ 34 as shown in FIG. 7 is designed to require the seatbelt webbing to apply a substantial force to the TCJ 34 to initiate webbing pay-out when no voltage is applied to the piezoelectric ring 46. Thus if the voltage amplifier 66 is somehow electrically disconnected from the piezoelectric ring 46 at the start of a dynamic event, the TCJ 34 can still resist pay-out of the seatbelt webbing.

FIG. 7 illustrates a second embodiment adaptive seatbelt assembly 114 in accordance with this disclosure. Only the differences from the seatbelt assembly 14 will be described. The same reference numbers will be used for the same corresponding elements.

In this embodiment the housing 42 and the piezoelectric ring 46 of the TCJ 34 change roles as the fixed and movable members with respect to the frame sidewall 22b. The housing 42 is not fixedly attached to the frame sidewall 22b. The housing 42 is slightly spaced from the frame sidewall 22b by a small air gap that enables relative rotation of the housing 42 about the axis A with respect to the sidewall. The second shaft 36 forms a cooperating non-rotatable splined or keyed connection with the housing end wall 44 that rotatably connects the second shaft 36 and the housing 42.

The piezoelectric ring 46 is circumferentially fixed to the sidewall 22b by interlocking teeth (not shown) or the like that allow radial expansion and contraction of the piezoelectric ring 46. Relative rotation between the housing 42 and the piezoelectric ring 46 is effectively the same as in the TCJ 34 of the seatbelt assembly 14. The sleeve 52 of the spider 48 closely receives the second shaft 36 but does not form a non-rotatable connection with the second shaft.

That is, the TCJ 34 can be realized with the piezoelectric ring 46 being movable with respect to the seatbelt frame 18 and the housing 42 fixed with respect to the seatbelt frame 18, or the TCJ 34 can be realized with the piezoelectric ring 46 being fixed with respect to the seatbelt frame 18 and the housing 42 movable with the seatbelt frame 18.

The TCJ 34 in possible embodiments of the seatbelt assemblies 14, 114 can be set to assist in locking the spool drum 20 only in higher deceleration dynamic events. In yet other alternative embodiments of the seatbelt assemblies 14, 114 a pretensioner 26 with a locking mechanism can be provided that locks the spool drum 20 in the pay-out direction of rotation and the TCJ 34 is solely relied on for performing an adaptive locking function.

Figure 8:
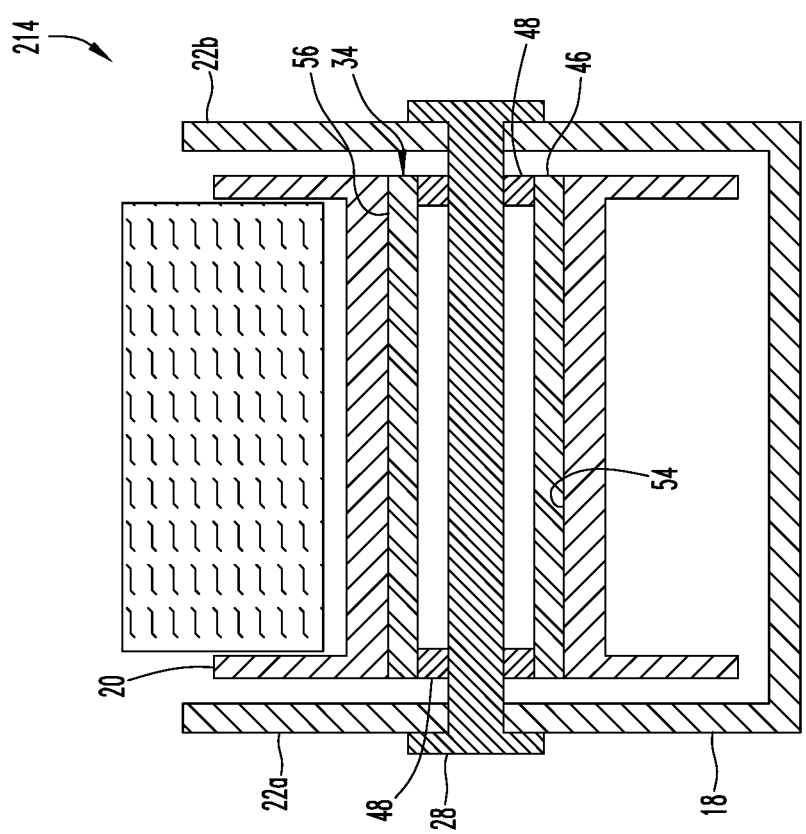
FIG. 8 is a vertical section view similar to FIG. 2 but of a third embodiment adaptive load-limiting seatbelt assembly in accordance with this disclosure.

FIG. 8 illustrates a third embodiment seatbelt assembly 214 in accordance with this disclosure. Only the differences from the seatbelt assembly 14 will be described. The same reference numbers will be used for the same corresponding elements.

The piezoelectric material of the TCJ 34 is realized as piezoelectric cylinder 46 coaxial with the spool axis of rotation and disposed in the frame 18. The piezoelectric cylinder 46 is surrounded by and extends substantially along the full axial length of the spool drum 20. The TCJ 34 utilizes the inside annular surface of the spool drum as the bearing surface 54 and the outer annular surface of the piezoelectric cylinder 46 as the bearing surface 56 that interact to form the controllable interference fit of the TCJ.

The stub shaft 28 and the second shaft 36 are replaced by a single shaft 28. The shaft 28 forms cooperating non-rotatable splined or keyed fits with the frame walls 22*a*, 22*b* to remain stationary with respect to the spool drum 20. The spider 48 is formed as two washers or collars that support the piezoelectric cylinder 46 and form non-rotatable connections with both the shaft 28 and the piezoelectric cylinder 46.

In this embodiment the main function of the shaft 28 is to carry the cylinder ring 46.

At the start of a dynamic event, the TCJ control system 58 applies sufficient voltage to the piezoelectric cylinder 46 to generate the desired interference fit between the spool drum 20 and the piezoelectric ring 46 at the beginning of the dynamic event. The control system 58 then regulates the interference fit for controlled adaptive pay-out of the seatbelt from the spool drum 20 during the dynamic event as described previously.

For normal operation of the seatbelt assembly 214, the TCJ maintains a relatively light interference fit for seatbelt pay-out or retraction.

Figure 9:
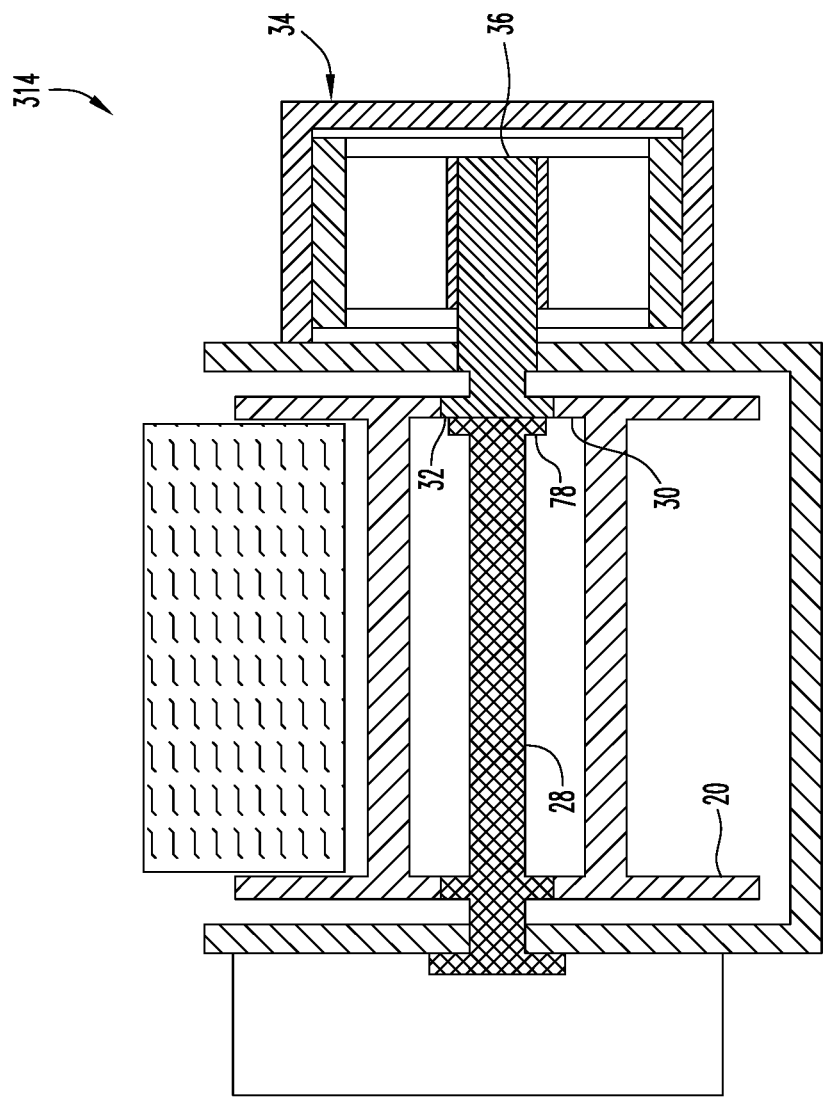
FIG. 9 is a vertical section view similar to FIG. 2 but of a fourth embodiment adaptive load-limiting seatbelt assembly in accordance with this disclosure.

FIG. 9 illustrates a fourth embodiment seatbelt assembly 314 in accordance with this disclosure. Only differences between the seatbelt assembly 314 and the seatbelt assemblies 14 and 114 will be described. The same reference numbers will be used for the same corresponding elements previously described.

The stub shaft 28 of the seatbelt assembly 14 is replaced with a longer shaft 28 that functions as a torsion bar. The torsion bar 28 of the seatbelt assembly 314 extends to a second end 78 closely adjacent to the inner faces of the drum and second shaft flanges 30, 32. The torsion bar second end 78 cooperates with the second shaft flange 32 to form a one-way rotatable connection that enables the torsion bar 28 to rotate with respect to the second shaft 36 when the spool drum 20 is driven in the retraction direction by the pretensioner 26. The one-way connection forms a non-rotatable connection between the torsion bar 28 and the second shaft 36 for conjoint rotation of the shafts when the spool drum 20 rotates in the pay-out direction.

At the start of a dynamic event, the pretensioner 26 is triggered. The pretensioner 26 includes a locking mechanism actuated when the pretensioner is triggered that allows the spool drum 20 to deform the locked torsion bar 28 as the spool drum rotates in the pay-out direction. Relative forward movement of the occupant causes the seatbelt webbing to unspool from the spool drum 20, urging the spool drum 20 to rotate in a pay-out direction. The spool drum 20 applies torque to both the torsion bar 28 and the second shaft 36 through the non-rotatable connection between the shafts. The torsion bar 28 and the second shaft 36 function as a unitary torsion shaft during the dynamic event.

Figure 10:
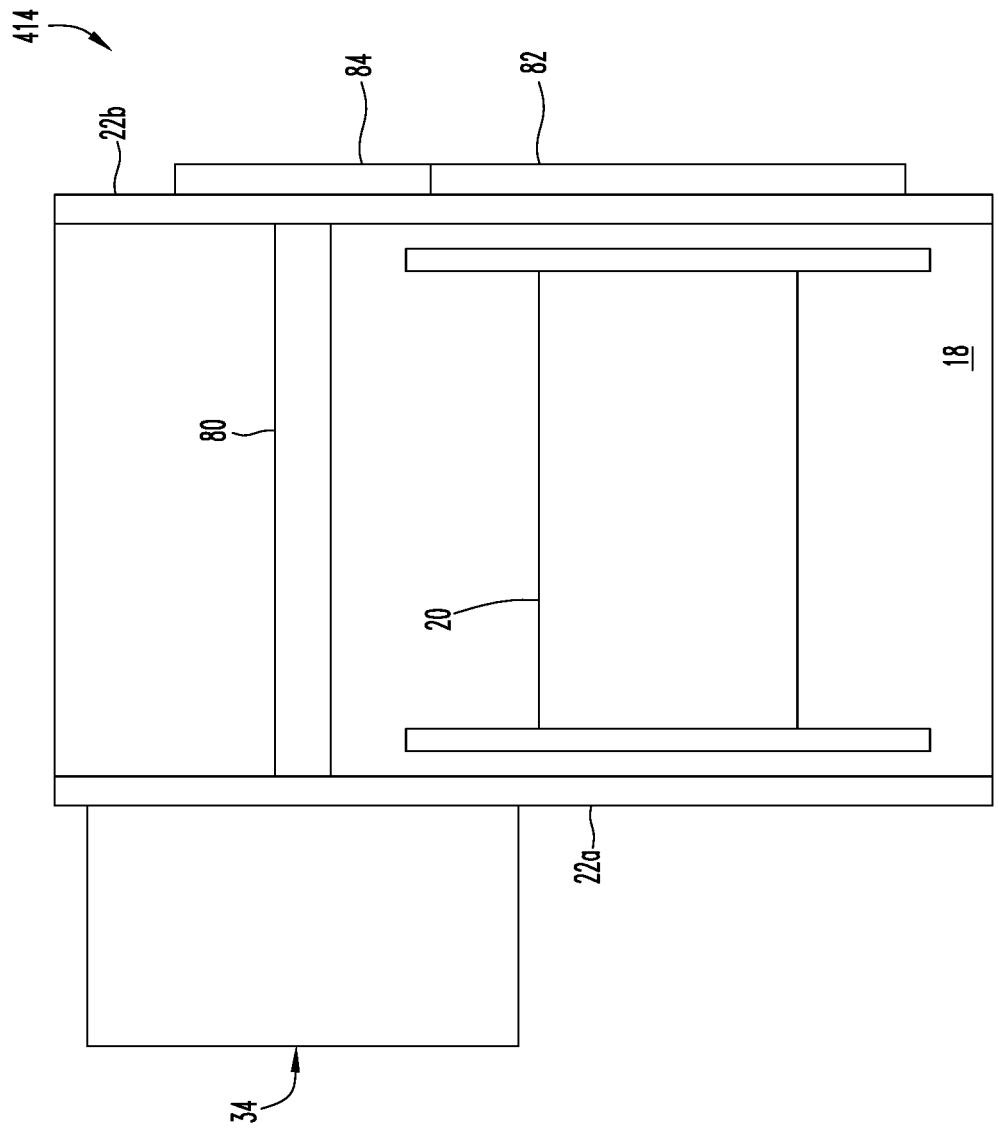
FIG. 10 is a top view of a fifth embodiment adaptive load-limiting seatbelt assembly in accordance with this disclosure.

FIG. 10 illustrates a fifth embodiment seatbelt assembly 414 in accordance with this disclosure. The same reference numbers will be used for the same corresponding elements previously described.

The seatbelt assembly 414 includes a spool drum 20 and a one-piece torsion bar 80 rotatably mounted between spaced-apart frame sidewalls 22*a*, 22*b*. In this embodiment the spool drum 20 and the torsion bar 80 rotate about respective axes of rotation that are not concentric with one another. The spool drum 20 and the torsion bar 80 are rotatably connected to one another by respective gears 82, 84 located on one side of the frame 18. The torsion bar 80 can be very rigid because it is not directly in contact with the spool drum 20.

The torsion bar 80 extends through the frame sidewall 22*b* on the other side of the frame 18 and extends into a Tailored Control Joint (TCJ) 34 attached to the outside of that sidewall 22*b*. The TCJ 34 is essentially identical to the TCJ 34 of the seatbelt assembly 14 and operates in the same manner to adaptively limit the seat belt force applied to the occupant during a dynamic event.

A redundant locking mechanism can be attached to the sidewall 22*a* adjacent the TCJ 34 and connected to the spool drum 20.

Examples of known seatbelt assemblies that disclose pretensioners, locking devices, and other seatbelt assembly components that can be adapted for use with the disclosed adaptive load-limiting seatbelt assembly include those disclosed in, for example, Miller, III et al. U.S. Pat. No. 5,547,143, Clute U.S. Pat. No. 7,318,560, Hiramatsu U.S. Pat. No. 7,392,957, Boelstler et al. U.S. Pat. No. 7,669,794, Clute U.S. Pat. No. 7,806,357, Gray U.S. Pat. No. 10,399,540, Clute US Patent Application Publication 2006/0082127, Lenning US Patent Application Publication 2007/0228204, Hiramatsu et al. US Patent Application Publication 2009/0057470, Schlaps et al. US Patent Application Publication 2020/0216016, and Jaradi et al. US Patent Application Publication 2020/0307507, each of which are incorporated by reference as if fully set forth herein.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in material selection, size, operating ranges, environment of use, use and implementation of a redundant locking mechanism, torsion bar location, configuration and stiffness, drive arrangements between the spool drum, torsion bar, and the relatively movable TCJ components, and use and implementation of a pretensioner and/or locking mechanism, as well as such changes and alterations that fall within the purview of the following claims.

What is claimed is:

1. An adaptive load-limiting seatbelt assembly for restraining an occupant of a passenger vehicle during a dynamic event, the assembly comprising:

a frame, a spool drum rotatably mounted to the frame for rotation about an axis, and a piezoelectric device, the spool drum carrying a length of seatbelt webbing that pays out from the spool drum for securing an occupant of the vehicle;

the piezoelectric device comprising a first member, a second member, and a control system, the first member being formed of a piezoelectric material;

one member of the first member and the second member being rotatably mounted with respect to the frame and the other of the first member and the second member being fixedly connected to the frame, the one member being non-rotatably connected to the spool drum by one or more mechanical non-rotatable connections whereby rotation of the spool drum urges rotation of the one member around a member axis and enables torque to be continuously transmitted through the one or more mechanical non-rotatable connections between the one member and the spool drum;

the first and second members comprising facing bearing surfaces being concentric with the member axis and being movable with respect to one another with rotation of the one member;

the first member being responsive to changes in applied voltage to the first member to define a variable interference fit between the two facing surfaces that generates a variable frictional force resisting relative motion of the two surfaces with respect to one another;

the control system comprising a controller, at least one sensor being configured and disposed to transmit a data signal to the controller representing the speed of pay-out and/or the amount of pay-out of seatbelt webbing from the spool drum, and a variable voltage source, the voltage source electrically connected to the first member;

The controller being configured to control rate of pay-out of the spool drum during the dynamic event by controlling the voltage applied to the first member by the variable voltage source in response to the data signal being received by the controller and thereby control the interference fit between the first and second members to control the rate of rotation of the spool drum during the dynamic event.

2. The adaptive load-limiting seatbelt assembly of claim 1 wherein the first member is the one member and the second member is formed as a housing containing the first member.

3. The adaptive load-limiting seatbelt assembly of claim 2 wherein the spool drum is supported on spaced apart frame portions, the spool drum being disposed between the frame portions, the housing forming the second member being fixedly attached to one of the frame portions and not disposed between the frame portions.

4. The adaptive load-limiting seatbelt assembly of claim 1 wherein the first member is the one member and is formed as a housing containing the second member.

5. The adaptive load-limiting seatbelt assembly of claim 4 wherein the spool drum is supported on spaced apart frame portions, the spool drum being disposed between the frame portions, the housing forming the first member being adjacent to one of the frame portions and not disposed between the frame portions.

6. The adaptive load-limiting seatbelt assembly of claim 1 further comprising a locking mechanism attached to the frame and a torsion bar rotatably supported on the frame for rotation about a bar axis;

the torsion bar comprising axially opposite first and second ends, the first end of the torsion bar being engageable by the locking mechanism to resist and effectively prevent rotation of the first end of the torsion bar about the bar axis, the one or more mechanical non-rotatable connections comprises the second end of the torsion bar being non-rotatably connected to the spool drum and to the first member whereby rotation of the spool drum urges rotation of the second end of the torsion bar about the bar axis as well as urges rotation of the one member about the member axis.

7. The adaptive load-limiting seatbelt assembly of claim 6 wherein the one or more mechanical non-rotatable connections further comprises a one-way mechanical non-rotatable connection formed from cooperating ends of the torsion bar and the one member when the spool drum is urged to rotate in the pay-out direction.

8. The adaptive load-limiting seatbelt assembly of claim 1 wherein the member axis is coaxial with the spool drum axis.

9. The adaptive load-limiting seatbelt assembly of claim 1 wherein the spool drum is also the second member of the piezoelectric device and is the one member of the piezoelectric device, and the first member of the piezoelectric device is surrounded by the spool drum.

10. The adaptive load-limiting seatbelt assembly of claim 9 wherein the spool drum is supported on and between spaced apart frame portions, and the first member is disposed between the frame portions.

11. The adaptive load-limiting seatbelt assembly of claim 1 wherein the piezoelectric device is the sole locking mechanism of the seatbelt assembly that operates to control pay-out of the spool drum during a dynamic event.

12. The adaptive load-limiting seatbelt assembly of claim 1 wherein the piezoelectric device forms a locking mechanism of the seatbelt assembly, and the seatbelt assembly further comprises an additional and redundant locking mechanism.

13. The adaptive load-limiting seatbelt assembly of claim 1 wherein the at least one sensor comprises a first sensor being configured to transmit a first data signal representing the rate of pay-out of seatbelt webbing from the spool drum and the second sensor being configured to transmit a second data signal representing the amount of pay-out of seatbelt webbing from the spool drum.

14. The adaptive load-limiting seatbelt assembly of claim 1 wherein the at least one sensor consists of one sensor, the one sensor being configured to transmit a data signal representing one of the following (a) and (b): (a) the rate of pay-out of seatbelt webbing from the spool drum, and (b) the amount of pay-out of seatbelt webbing from the spool drum.

15. The adaptive load-limiting seatbelt assembly of claim 1 wherein the controller comprises a processor and memory accessible by the processor, the memory storing at least one control process routine executable by the processor.

16. A method for adaptive load limiting of a seatbelt assembly during a dynamic event to reduce the risk of injury to an occupant of the seatbelt assembly by regulating rotation of a spool drum of the seatbelt assembly in a pay-out direction during the dynamic event to control pay-out of seatbelt webbing carried by the spool drum, the method comprising the step of:

(a) modulating an interference fit between a rotatable member connected to the spool drum for conjoint rotation with the spool drum and a fixed member fixed with respect to the spool drum, the spool drum being non-rotatably connected to the rotatable member through one or more mechanical non-rotatable connections whereby torque can be continuously transmitted between the spool drum and the rotatable member through the one or more mechanical non-rotatable connections.

17. The method of claim 16 wherein step (a) comprises the step of:

(b) modulating a voltage applied to the rotatable member.

18. The method of claim 16 wherein the rotatable member is made of a piezoelectric material.

19. The method of claim 17 wherein step (b) comprises the step of:

(c) modulating the voltage in response to the speed of pay-out of the seatbelt webbing from the spool drum or in response to the amount of pay-out of seatbelt webbing from the spool drum.

20. The method of claim 16 including the step of pre-tensioning the seatbelt webbing against the occupant prior to performing step (a).

21. The method of claim 16 wherein the one or more non-rotatable mechanical connections comprises a first mechanical non-rotatable connection connecting the spool drum to a torsion bar and a second mechanical non-rotatable connection connecting the torsion bar to the rotatable member.

22. The method of claim 16 wherein the one or more mechanical non-rotatable connections comprises a splined connection or a keyed connection.

23. The adaptive load-limiting seatbelt assembly of claim 1 wherein the one or more mechanical non-rotatable connections comprises a splined connection or a keyed connection.

24. The adaptive load-limiting seatbelt assembly of claim 1 wherein the one or more mechanical non-rotatable connections comprises a first non-rotatable mechanical connection connecting the spool drum to a torsion bar and a second non-rotatable mechanical connection connecting the torsion bar to the one member.

* * * * *